Nov. 6, 1928.                                                    1,690,360
C. R. BROWN ET AL
PROCESS OF MANUFACTURING STARCH AND GLUCOSE
Filed Oct. 31, 1925

```
                        STEEP TUBS
                            |
                   FIRST DEGERMINATING MILLS
                        FUSS MILLS
                            |
                   FIRST GERM SEPARATOR → GERMS OFF HERE
                            ← FIRST SEPARATOR SLOP
                            ← MAY BE SCREENED HERE
                            |
                   SECOND DEGERMINATING MILLS
                        FUSS MILLS
                            |
                   SECOND GERM SEPARATOR → GERMS OFF HERE
                            ← SECOND SEPARATOR SLOP
                            |
                   COPPER REELS → HULLS OFF HERE
                            |
                   GRIT SHAKERS → GRITS OFF HERE
                            |
                   HEAVY STARCH LIQUOR
```

{ THE STEP OF TREATING MATERIALS BEING PROCESSED TO A WATER-HYDROCHLORIC ACID BATH MAY BE PRACTISED AT ANY POINT SUBSEQUENT TO STEEPING AND PRIOR TO CONVERSION INTO GLUCOSE

PORTION OF HEAVY STARCH LIQUOR RETURNED TO SYSTEM PREFERABLY TO FIRST GERM SEPARATOR

BUHR MILLS

COPPER REELS → SLOP HERE TO FEED HOUSE

←— HEAVY STARCH LIQUOR

17 SILK REELS → #17 TAILINGS OFF HERE

STARCH LIQUOR

SETTLING TABLE

{ STARCH —→ { GLUTEN OFF HERE / TO FEED HOUSE }

TO STARCH CONVERTER FOR GLUCOSE

*Inventors:*
CHARLES R. BROWN, & HUBERT E. NELSON
By Jones, Addington, Ames & Seibold
*Attys.*

Witness:
W. K. Olson

Patented Nov. 6, 1928.

1,690,360

UNITED STATES PATENT OFFICE.

CHARLES R. BROWN, OF KANSAS CITY, MISSOURI, AND HUBERT E. NELSON, OF KEOKUK, IOWA.

PROCESS OF MANUFACTURING STARCH AND GLUCOSE.

Application filed October 31, 1925. Serial No. 65,949.

Our invention relates to a new and improved process for manufacturing starch, glucose and other substances from cereals, such as corn or other plant tissues containing starch grains.

One object of our present invention is to provide an improved process of the character indicated above which will effect the expeditious removal of objectionable substances heretofore encountered in the commercial manufacture of starch, glucose, gluten, etc. from the materials being processed, such as the steeped corn kernels, either before or after grinding, starch liquor or other product or by-product bearing starch, thereby procuring end products which may consist of commercial starch or glucose or gluten material, etc. that will be substantially free from objectionable impurities.

Another object of our invention is to provide a cheap and economical process for procuring exceptionally pure end products or by products of the character mentioned without requiring excessive washing, tabling and handling of the materials during the process of manufacture, such as has been practiced heretofore in order to procure end products of the required degree of purity.

Other objects and advantages accruing to our present invention will be readily perceived from the following description to which reference may now be had for a better understanding of the nature, scope and characteristic features of our present invention.

We have appended a drawing which is a schematic diagram of one process for manufacturing starch, which process embodies a form of our invention, the diagram mainly, and excepting the steps which constitute our invention, being representative of a commercial process for securing starch as the end product which is exceptionally free from impurities and adapted for the manufacture of glucose. The schematic diagram is illustrative of one well known process for manufacturing starch prior to its conversion into glucose, except that such steps in the process are added which constitute the improvement of our present invention, but it is to be understood that our improvement is not limited to any specific process but is capable of being applied to any of the present commercial processes.

For the purpose of describing with particularity our new and improved process, we will devote the description of our invention to one process for manufacturing starch and glucose from corn. It is to be kept in mind that the apparatus employed in the commercial manufacture of starch and glucose is very massive and large, including steeping vats, settling tanks, grinding mills, draining and screening boxes, pipes, etc., all of which embody in their construction large quantities of iron. The materials being processed are usually mixed in steeping tubs with a suitable acid-water bath which exerts a softening effect upon the kernels and, at the same time, prevents undesirable fermentative changes. This mixture must necessarily come into intimate contact with the iron that is incorporated in the structure of the steeping tubs which iron, in turn, is dissolved and appears to combine with the materials in such manner that iron compounds are formed which we believe are insoluble iron compounds. These iron compounds constitute some of the impurities that must be eliminated from the end products in order to render them suitable as commercial products. Heretofore, it has been very difficult to eliminate these impurities and particularly the iron compounds from the end products without unduly treating the end products and rehandling them by repeated washings and retabling in order to render them sufficiently pure for commerce. If these impurities are present in any substantial degree, and specially the iron compounds, the cost of eliminating these impurities has been prohibitive because their elimination could only be effected by additional treatment and processing which resulted in increasing greatly the cost of manufacture. The impurities, and particularly the iron compounds, if present to any appreciable degree, affect the end products, such as the starch or glucose by discoloring them which renders them uncommercial.

As a consequence, the main feature of our present invention is directed to an improved process for removing the objectionable substances encountered in the manufacture of starch and glucose, which consists in adding diluted hydrochloric acid or other suitable acid having an avidity comparable to hydrochloric acid, as for example, nitric acid, sulphuric acid, etc., to "starch liquor" comprising starch gluten and other soluble and insoluble substances at any suitable point in the process of manufacture, such acid being added subsequent to the steeping of the grain, and in this illustrative example, the whole corn kernels. The step of our invention may be practiced before or during the process of the final washing or tabling, or subsequent to the tabling if the starch is to be converted into glucose. For instance, the step in our improved process may be practiced upon the substance or materials produced at the time of grinding the grain subsequent to the steeping step, or upon the number 17 tailings or upon the gluten or any other product or by-product.

It is to be understood that our present invention, which contemplates treating the materials with a water-acid bath is to be distinguished from the well known use of acid for treating starch during the converting period of the starch into glucose, since our invention is directed to the removal of the impurities from the starch prior to admitting the starch into the converters and prior to the starch being converted into glucose and other products. As a consequence, the by-products resulting from the conversion of the starch are purified and the converting process is rendered more expeditious because the starch is already purified before converting it into glucose and other products.

The step of our improved process, which consists in subjecting the materials being processed to the action of a water-acid bath is for the purpose of either rendering soluble or easily removable, the iron compounds or other compounds or substances which are present in the starch liquor or other products or by-products, or in the ground corn, so as to eliminate the said impurities during the process of manufacture, or before the period of conversion when it is intended that the starch is to be converted into glucose. In many instances, it will be highly desirable to practice the step of our present invention prior to the tabling of the starch thereby ensuring the production of commercial starch of a very high degree of purity. The step of our present invention, by means of which a water-hydrochloric acid bath or baths comprising other acids producing similar or analogous effects, results in causing the iron impurities or other objectionable substances either to become soluble or to render them in such a finely divided state as to cause the impurities to pass off during the washing of the "starch liquor" or the washing of the products or by-products.

It will be pointed out hereinafter that the step of our invention which contemplates the treating of the starch liquor or other products or by-products with a water-hydrochloric acid bath or other suitable water-acid bath may be made at any suitable point in the process of manufacture of the starch and our present invention comprehends within its scope the practicing of this purifying step subsequent to the steeping of the cereal and preferably prior to the tabling step if the final end product is starch; otherwise, if the final end product is glucose and similar products, the purifying step of our invention may be practiced subsequent to the tabling of the starch but prior to the converting of the starch into glucose.

As a specific illustrative example of a preferred method of practicing our invention, we will describe the process of manufacturing starch which is diagrammed on the drawing forming a part of this specification.

The whole corn is put into the steep tubs which may hold several thousand bushels and wherein the whole corn kernels are soaked from 50 to 60 hours in a warm water bath containing from .2 per cent to .3 per cent of sulphurous acid. It is usual to construct the steep tubs in batteries, each steep tub being 10 to 12 feet in depth and 6 to 8 feet in diameter. When the steep tubs are arranged in such a battery formation, the new corn is admitted into the first steep tub and the steeping water containing the sulphurous acid is circulated from tub to tub by a counter current system which causes the steeping water to flow opposite to the direction of movement of the corn through the battery of the steep tubs. As a consequence, the dry corn kernels contained in the first steep tub are soaked with the oldest steep water in the battery. This steeping water containing the sulphurous acid is maintained at a temperature of from 115° F. to 130° F. by injecting steam into the steeping water bath. As a result of the counter current circulation of the steep water, the corn in the first steep tub, which is the new corn, is subjected to a water bath that contains approximately .03 per cent of sulphurous acid while the corn in the last steep tub of the battery is subjected to the steeping water possessing the full acid concentration of substantially .2 per cent to .3 per cent of sulphurous acid. The sulphurous acid seems to have a softening effect on the glutinous parts of the whole corn kernels and, at the same time, prevents undesirable fermentative changes in the corn grains. However, this sulphurous acid bath appears to cause the basic salts in the whole corn kernels which are principally potassium phosphates, to be changed into acid salts, probably into di- or mono-acid forms of these potassium salts.

The aforementioned steeping water-acid bath, by reason of its coming into contact with the iron embodied in the structure of the steep tubs, dissolves the iron which, on coming in contact with the phosphates in the new corn combines to form what we believe are insoluble iron phosphates, which are the impurities that must subsequently be eliminated or minimized to avoid contaminating the starch or other end products or by-products. These insoluble iron phosphate compounds which, on passing forward in the process, result in the production of undesirable and uncommercial end products. Therefore, our invention is directed particularly to the removal of these insoluble iron phosphates in order that the end products such as the starch, the glucose, gluten, number 17 "tailings", etc. will be substantially purified and thereby made commercial.

After the whole corn kernels have been softened by the steeping in the warm-water sulphurous acid bath, the corn is then passed through a Fuss or degerminating mill where the kernels are readily disintegrated by being cracked into rough pieces and the germ at the apex of the kernel is loosened. Inasmuch as the germ contains practically all of the oil it is desirable to separate the germs from the other parts of the kernels and, therefore, from the Fuss mill the cracked kernels are passed to the first germ separator. Here it is usual to mix the cracked kernels, the loosened germs, the hulls, fibrous material, etc. with heavy starch liquor that is withdrawn from the system and recirculated in order to carry the bulk of the germs off at the top of the first germ separator.

The germ separator is a tank containing an agitator so constructed that its movement brings the germs to the surface where they are removed from the separators by an appropriately placed opening, the heavier parts of the corn kernels and the hulls passing off at the bottom of the germ separator. The material coming out at the bottom of the first germ separator is called the "first separator slop". The first separator slop may, if desired, be screened to remove the starch therefrom and the residue may then be run into a second Fuss or degerminating mill, or, if desired, the whole of the first separator slop may be run into the second degerminating mill. At the second germinating mill the residue is subjected to further grinding in order to make a more complete separation of the germ from the rest of the kernel. From the second degerminating mill the material is passed to a second germ separator, where substantially all of the remaining germs are segregated from the remaining portions of the kernels. The germs from the first and second germ separators are washed by passing them over reels and shakers to remove the starch adhering to them. The germs are then dried, ground and the oil contained in them is pressed out by means of an oil press of the usual construction. The oil is used principally for soap making and for other industrial purposes. The residue constitutes oil cake which is an excellent cattle food and may be ground into a meal or utilized in the original cake.

The material flowing out of the bottom of the second separator, which is now designated as "second separator slop," contains the bulk of the starch and this is first run over copper reels to remove the coarse material, such as the hulls. The material passing through the copper reels, which constitutes starch liquor containing fine grits, small pieces of hulls, etc., is then run over silk shakers or grit shakers. The material passing through the grit shakers is known as "heavy starch liquor" and this heavy starch liquor is mainly conducted to the settling table, while a portion of it is returned into the system, preferably at the first germ separator as explained above.

The hulls that are derived from the copper reels and the grits which are derived from the silk or grit shakers are mixed together and passed to a buhr-stone mill where they are reground. The material fed to the buhr-stone mill is a damp mushy conglomerate. From the buhr-stone mill the semi-liquid mass is passed over copper shakers where it is washed by counter currents of clear water to remove the starch. The starch liquor passing through the copper reels is then fed to the number 17 silk reels. The residue or slop discharged from the copper reels without passing through the copper sieve, which is designated as "fine slop", is run through moisture expellers to remove the water and at this point looks like coarse sawdust. This coarse sawdust material is led to the feed house where it may be mixed with other by-products.

The starch liquor passing from the copper reels is fed to the number 17 silk reels, as mentioned above. The material left on these silk reels is called "No. 17 tailings," this because it is incapable of passing through the number 17 silk utilized in the construction of these silk reels. The starch liquor passing through the number 17 silk reels is combined with the aforementioned starch liquor passing through the grit shaker and together these two starch liquors are run onto the settling table which will be described later.

The number 17 tailings contain 20% to 35% starch and these number 17 tailings are filter-pressed in order to remove the moisture and are then passed to the feed house where they become part of the feed.

The starch liquor flowing to the settling table has a gravity of about 6° Bé. and the temperature of the starch liquor at this time is approximately between 85° F. and 90° F. The settling table is inclined about 4 inches in 120 feet of length and is approximately 24 inches wide. The starch liquor is run onto the table at the rate of 2 gallons to 3 gallons per minute, the starch being heaviest will settle on the table and the gluten will flow off at the end of the table with the water.

The gluten water flowing from the settling table has a specific gravity of about 1° Bé.

It is settled in gluten settlers and the sloppy mass is taken from the bottom, filter-pressed and then passed to the feed house. The gluten liquor from the settling table contains a considerable starch content which is difficult to recover as commercial starch.

The starch deposited upon the table forms a substantially thick layer at the upper end of the table and this layer tapers off towards the end of the table. The starch deposited upon the table is either subsequently treated to produce commercial starch or is treated in converters to produce glucose.

The foregoing description which constitutes a specific illustrative example of a commercial process for manufacturing starch as practiced today, does not provide for the elimination of the insoluble iron compounds which are formed at the time that the whole corn kernels are being treated in the steep tubs. These impurities, which we believe are insoluble iron phosphates, and other compounds, are contained in the final end product, namely, the starch upon the settling table and the only method heretofore available for removing these impurities consisted in subjecting the starch to repeated washings and retabling in order to purify sufficiently the starch for commercial use.

As we have stated above, it is highly desirable to remove these iron compounds and impurities from the starch deposited upon the table prior to the time of converting this starch into glucose and other end products, otherwise these end products, such as the glucose, will be uncommercial. The procedure heretofore necessary to remove these iron compounds and impurities from the end products has greatly added to the expense of manufacturing starch and glucose, even under favorable conditions, and, heretofore, it has never been possible to remove completely these impurities prior to the converting of the starch. The difficulty in purifying the starch, prior to converting it when glucose is the final end product, has always been a very serious problem in the manufacture of glucose, but by practicing the step of our invention, the impurities and particularly what we believe to be the insoluble iron phosphates and compounds are substantially completely removed from the end product prior to the converting of the starch into glucose and, as a consequence, we are able to manufacture glucose very economically and to procure a glucose that is extremely pure and substantially devoid of any insoluble iron compounds.

By referring again to the diagram, it has been pointed out that the insoluble iron compounds are almost completely formed during the time that the whole corn kernels are mixed with the sulphurous acid bath in the steeping tubs. From the time that the corn kernels leave the steeping tubs all of the products and by-products are contaminated with these insoluble iron phosphates and compounds. For instance, the germs derived from the germ separators may be contaminated with these insoluble iron compounds, the slop discharged from the copper reels subsequent to the treatment of the material in the buhr mills may be contaminated with these impurities, the number 17 tailings from the number 17 silk reels may be likewise contaminated, the gluten procured from the settling tablt may be contaminated with these impurities and, similarly, the starch deposited upon the settling table as well as the gluten tailings.

Our invention comprehends the step in the aforesaid process which will purify the various materials in order to eliminate substantially from them what we believe to be the insoluble iron phosphates and compounds and other impurities.

As an illustrative example of how our invention may be practiced, the starch taken from the settling table and prior to being converted into glucose and other end products is treated with a water-acid bath, preferably comprising a weak solution of hydrochloric acid. The hydrochloric acid in this treating bath may vary in concentration from .02% to .05% and, in some instances, may be of higher concentration when the impurities are excessive, but the concentration of the acid should be at all times sufficiently low to preclude any substantial hydrolysis of the starchy materials and to prevent deleterious action on the iron containers or other iron portions of the apparatus, and of such low concentration that the rate of solution of any iron that may be in contact with the acid-water bath will be substantially negligible with respect to the action that the acid-water bath exerts on the impurities to be removed thereby. When the starch from the settling table is washed with this hydrochloric acid bath, the insoluble iron phosphates and other iron impurities are readily removed from the starch. It is our theory that this hydrochloric acid bath increases the colloidal dispersion of these insoluble iron compounds and other impurities which are readily washed from the materal being processed and run off from the system. It may be that this hydrochloric acid bath renders the aforesaid impurities soluble but, at any rate, we have found that when proceeding with the process for manufa turing starch, glucose and other by-products and end products, substantially pure by-products and end products may be secured by washing the materials being processed at any appropriate point in the process with a water-hydrochloric acid bath of the character described thereby facilitating the removal of the impurities. It is to be understood, of course, that the step of our invention that comprises washing the materials being processed with this hydrochloric acid bath may be practiced at any point in the process after the whole corn kernels leave the steeping tubs. For instance, the germs drawn from the germ separators may be washed with this hydrochloric acid bath in order to cleanse them of the insoluble iron phosphate compounds. Again, the number 17 tailings may be washed with this hydrochloric acid bath in order to eliminate therefrom the insoluble iron phosphate compounds and other impurities. The gluten flowing from the settling table may be also treated with this hydrochloric acid bath in order to remove the impurities and, likewise, the starch deposited upon the settling table may be treated with this hydrochloric acid bath prior to converting it into glucose.

If the materials being processed are to be treated with the water-hydrochloric acid bath previous to the tabling of the starch, the bulk of the impurities which have been made soluble by this acid bath or which have had their colloidal dispersion increased by reason thereof are carried off in the gluten water and in the water which is pressed from the number 17 tailings. The resulting starch and by-products under such treatment will be pure enough for ordinary manufacturing purposes.

If the various by-products are to be treated separately by subjecting them to a water-hydrochloric acid bath, the procedure may be carried on as follows: In treating the number 17 tailings they are mixed after they leave the reels with a water-hydrochloric acid bath to make the impurities contained therein either soluble or possessed of increased colloidal dispersion. The mass is then run into a filter press fitted with standard washing devices. Such a filter press is well known in the art and many such presses of standard construction will be suitable. Here the impurities are washed from the number 17 tailings by passing water through the filter cake until such impurities are reduced to a minimum.

If the gluten is to be treated with a water-hydrochloric acid bath, the settled gluten from the gluten settlers may be treated in the same manner as the number 17 tailings.

If the starch is to be treated with the water-hydrochloric acid bath, it is flushed from the settling table with water and to the resulting liquid starch bath hydrochloric acid is added and the whole is then filtered in a plate and frame washing press of any standard construction, or on a continuous filter of any of the well known forms which are fitted with washing sprays. In washing any of the by-products, hydrochloric acid may or may not be added, as desired, to the washing water which may be applied to the various end products when such end products are in the form of cakes, resulting from the passing of the materials through the various filters.

While we have indicated in the diagrammatic representation a process for manufacturing starch from whole corn kernels which process includes the step of our invention which is directed to the treating of the material being processed with a water-hydrochloric acid bath, it is to be understood that our invention may be practiced at any point in the process subsequent to the time that the material being processed leaves the steeping tubs and prior to the time that the starch is to be converted into glucose. For instance, the materials being processed may be treated in accordance with our invention with the hydrochloric acid bath before or during the steps of washing, tabling or settling thereby rendering the impurities readily removable to produce substantially pure end products. It is our theory that the acid water, namely the sulphurous acid water, when mixed with the whole corn kernels as they are first fed into the steep tubs dissolves the iron embodied in the structure of the tubs and that this dissolved iron, on coming in contact with the phosphates contained in the whole corn kernels combines to form insoluble compounds which appear to be insoluble iron phosphates. Heretofore these impurities have been very difficult to remove and the methods practiced for removing them consisted generally in repeated washing and retabling. As a consequence, these old methods for eliminating the impurities have been expensive and tedious and the end products suitable for converting into starch have been a small percentage only of the total quantity of starch present therein. By means of our invention being practiced during the process of manufacturing the starch, these iron impurities are capable of being substantially completely removed with a very economical treatment, namely, subjecting the material being processed, at any suitable point, to a water-hydrochloric acid bath of the proper concentration, as herein described. The hydrochloric acid bath removes the iron impurities undoubtedly by increasing their colloidal dispersion. Consequently, the impurities are capable of being readily washed from the materials being processed and substantially pure end products are the result.

It is to be understood, of course, that our invention is directed to an improved process of manufacturing starch and glucose from whole corn kernels and other cereals which aims to remove objectionable substances from the starch and glucose that are encountered in the manufacturing processes heretofore practiced. Our invention is specifically directed to subjecting, at a suitable point, the materials being processed to a water-hydrochloric acid bath of the proper concentration or other suitable acid bath for the purpose of rendering soluble or for forming compounds with the iron or other impurities found in the material being processed or for increasing the colloidal dispersion of these impurities in such a manner that they may be readily removed by passing off during the washing thereof. Of course, it is to be understood that we do not claim the well known use of hydrochloric acid or other acid which is employed during the process of converting the starch into glucose or corn syrup.

While we have mentioned hydrochloric acid as being the preferred substance for purifying the materials being processed, as mentioned above, it is conceivable that other acids may be satisfactory for this purpose and we, therefore, intend that such other acids be included within the scope of our invention if such other acids serve the same purpose of purifying, in the manner referred to above, the materials being processed for the manufacture of starch and glucose. While we are the first to employ a water-hydrochloric acid bath, subsequent to the steeping of the whole corn kernels and prior to feeding the materials being processed to the glucose converters, for the purpose of removing iron impurities, it is to be understood that our invention is not to be limited except by such limitations that are set forth in the appended claims.

We claim:

1. The process for removing substantially insoluble iron salts from starchy materials which comprises treating them with a dilute acid solution of low concentration but having an avidity comparable to hydrochloric acid whereby the insoluble iron salts are converted into soluble iron salts, and then washing the starchy materials to remove therefrom the solubilized iron salts and the residual acid.

2. The process for removing substantially insoluble iron phosphates from starchy materials containing the same which comprises treating them with a dilute solution of an halogen acid whereby the insoluble iron phosphates are solubilized without causing hydrolysis of said starchy materials, then washing said starchy materials to remove substantially therefrom the solubilized iron phosphates and the residual halogen acid.

3. The process for removing substantially insoluble iron phosphates from starchy materials containing the same which comprises treating the starchy materials with a hydrochloric acid solution having an HCl concentration of not over 0.05 per cent whereby the insoluble iron phosphates are solubilized, and then washing the starchy materials to remove therefrom the solubilized iron phosphates and any residual hydrochloric acid.

4. The process of removing insoluble iron phosphates from starchy materials which comprises subjecting said starchy materials to the action of a dilute solution of hydrochloric acid of such concentration that solubilization of the said iron phosphates is effected without hydrolyzing substantially said starchy materials, and then washing said solubilized iron phosphates and the residual hydrochloric acid from said starchy materials.

5. In the process of manufacturing starch wherein farinaceous materials are subjected to steeping in a sulphurous acid bath whereby insoluble iron salts are introduced into said materials, that step which comprises treating said materials subsequent to the steeping with a dilute hydrochloric acid solution thereby causing said iron salts in said materials to be more completely colloidally dispersed, and then washing said materials to remove the said iron salts and the residual hydrochloric acid.

6. In the process of manufacturing starch wherein farinaceous materials are subjected to steeping in a sulphurous acid bath whereby insoluble iron phosphates are introduced into said materials, that step which comprises treating said materials subsequent to the steeping step with a hydrochloric acid solution having a concentration of less than 0.05 per cent to increase the colloidal dispersion of said iron phosphates contained in said materials, and then washing said materials to free them from said iron phosphates and the residual hydrochloric acid.

7. In the process of manufacturing starch wherein starchy materials are subjected to steeping in a sulphurous acid bath whereby insoluble iron salts are introduced therein, that step which comprises treating said starchy materials subsequent to the steeping step with a dilute hydrochloric acid bath having a concentration sufficiently high to solubilize substantially all of the iron salts contained in said materials and sufficiently low to preclude any substantial hydrolyzing action on said materials, and subsequently washing the solubilized iron salts and residual acid from said materials.

In witness whereof, we have hereunto subscribed our names.

CHARLES R. BROWN.
HUBERT E. NELSON.